United States Patent
Kim et al.

(10) Patent No.: US 10,210,732 B2
(45) Date of Patent: *Feb. 19, 2019

(54) APPARATUS AND METHOD FOR INDICATING STATUS OF HYDROGEN TANK BASED ON VEHICLE FIRE

(71) Applicant: Hyundai Motor Company, Seoul (KR)

(72) Inventors: Chang Ho Kim, Gyeonggi-Do (KR); Sang Hyun Kim, Gyeonggi-do (KR); Ji Hyun Shim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/729,423

(22) Filed: Oct. 10, 2017

(65) Prior Publication Data

US 2018/0033274 A1    Feb. 1, 2018

Related U.S. Application Data

(62) Division of application No. 14/569,749, filed on Dec. 14, 2014, now Pat. No. 9,959,724.

(30) Foreign Application Priority Data

Jun. 27, 2014   (KR) .......................... 10-2014-0079739

(51) Int. Cl.
*B60Q 1/26* (2006.01)
*G08B 17/00* (2006.01)
(Continued)

(52) U.S. Cl.
CPC .............. *G08B 17/00* (2013.01); *B60Q 1/52* (2013.01); *G08B 21/187* (2013.01)

(58) Field of Classification Search
CPC ......... G08B 17/00; G08B 21/187; B60Q 1/52
(Continued)

(56) References Cited

U.S. PATENT DOCUMENTS 3,723,987 A    3/1973   Barone, Jr. et al.
5,554,976 A    9/1996   Miyauchi et al.
(Continued)

FOREIGN PATENT DOCUMENTS

CN    101572320 A    11/2009
CN    101576171 A    11/2009
(Continued)

*Primary Examiner* — Kerri L McNally
*Assistant Examiner* — Thang D Tran
(74) *Attorney, Agent, or Firm* — Mintz Levin Cohn Ferris Glovsky and Popeo, P.C.; Peter F. Corless

(57) ABSTRACT

An apparatus and a method of indicating safety of a hydrogen tank when a vehicle fire occurs are provided. The apparatus includes a hydrogen storing tank and a thermal pressure relief device (TPRD) mounted within a valve of the hydrogen storing tank. In addition, a controller is configured to detect a flow rate of hydrogen discharged from the hydrogen storing tank, using a sensor to determine whether the detected flow rate of discharged hydrogen is within a predetermined reference flow rate range. The controller is also configured to transmit a warning signal when the detected flow rate of discharged hydrogen is included within the predetermined reference flow rate range.

15 Claims, 2 Drawing Sheets

(51) Int. Cl.
*B60Q 1/52* (2006.01)
*G08B 21/18* (2006.01)

(58) Field of Classification Search
USPC .......................................................... 340/468
See application file for complete search history.

(56) References Cited

U.S. PATENT DOCUMENTS

| | | | | |
|---|---|---|---|---|
| 5,647,390 | A | * | 7/1997 | Wass ..................... F16K 17/383 137/68.12 |
| 5,888,051 | A | * | 3/1999 | McLoughlin ......... F04B 49/065 417/26 |
| 6,446,616 | B1 | | 9/2002 | Kabat et al. |
| 7,224,285 | B2 | | 5/2007 | Tiwet et al. |
| 7,337,799 | B2 | * | 3/2008 | Delfino ............ B60K 15/03006 137/266 |
| 2001/0024746 | A1 | * | 9/2001 | Ueda ................. H01M 8/04089 429/423 |
| 2002/0119355 | A1 | * | 8/2002 | Shimada ........... H01M 8/04208 429/442 |
| 2003/0150625 | A1 | | 8/2003 | Smith et al. |
| 2005/0154228 | A1 | | 7/2005 | Nakajima et al. |
| 2005/0268971 | A1 | * | 12/2005 | Nasalroad ............ F16K 24/046 137/565.13 |
| 2006/0051635 | A1 | | 3/2006 | Kamihara |
| 2007/0095392 | A1 | * | 5/2007 | Billings .................... F16K 3/24 137/39 |
| 2008/0121015 | A1 | | 5/2008 | Heuvel et al. |
| 2009/0297897 | A1 | * | 12/2009 | Boyd .................. G01M 3/2815 429/404 |
| 2010/0001851 | A1 | * | 1/2010 | Handa ...................... F17C 1/16 340/438 |
| 2011/0114193 | A1 | * | 5/2011 | Chen ........................ F17D 5/02 137/14 |
| 2011/0127263 | A1 | * | 6/2011 | Lee ......................... F17C 13/12 220/89.2 |
| 2012/0318378 | A1 | * | 12/2012 | Yahashi ............... B60K 15/077 137/334 |
| 2013/0037165 | A1 | * | 2/2013 | Okawachi ................ F17C 5/06 141/4 |
| 2013/0106594 | A1 | | 5/2013 | Hiramatsu et al. |
| 2013/0160872 | A1 | * | 6/2013 | Schulze ................ F16K 17/383 137/468 |
| 2014/0220469 | A1 | * | 8/2014 | Heise .................... F16K 31/002 429/442 |
| 2014/0261742 | A1 | * | 9/2014 | Heise ................. F16K 37/0083 137/15.18 |
| 2015/0168041 | A1 | | 6/2015 | Havard, Jr. et al. |

FOREIGN PATENT DOCUMENTS

| | | |
|---|---|---|
| CN | 102593486 A | 7/2012 |
| FR | 2791758 A1 | 10/2000 |
| JP | 2001-189161 A | 7/2001 |
| JP | 2001-336729 A | 12/2001 |
| JP | 2004-131055 A | 4/2004 |
| JP | 2004-136828 A | 5/2004 |
| JP | 2005-251664 A | 9/2005 |
| JP | 2006-108024 A | 4/2006 |
| JP | 2009-138904 A | 6/2009 |
| JP | 2011-117543 A | 6/2011 |
| KR | 10-2009-0111925 A | 10/2009 |

* cited by examiner

APPARATUS AND METHOD FOR INDICATING STATUS OF HYDROGEN TANK BASED ON VEHICLE FIRE

CROSS REFERENCE TO RELATED APPLICATION

This application is a divisional application of the U.S. patent application Ser. No. 14/569,749, filed Dec. 14, 2014, which claims under 35 U.S.C. § 119(a) priority to Korean Patent Application No. 10-2014-0079739 filed on Jun. 27, 2014, the entire contents of which are incorporated herein by reference.

BACKGROUND

Technical Field

The present disclosure relates to an apparatus and a method that indicates a status of a hydrogen tank when a vehicle fire occurs, and more particularly, to an apparatus and a method that indicates a status of a hydrogen tank, which notifies a driver when a fire occurs within a fuel cell vehicle to assist in fire suppression and life rescue activities.

Background Art

A hydrogen fuel cell vehicle is a vehicle which drives a motor using charges generated in a reaction of hydrogen and oxygen by using hydrogen as fuel. A hydrogen storage system is disposed within the hydrogen fuel cell vehicle, and a high pressure hydrogen storing system of about 700 bar, which currently has the highest commercialization performance, has been used. The hydrogen storing system supplies oxygen and hydrogen to a stack to generate electricity, and a pressure of the hydrogen supplied to the stack is about 0.3 bar.

In general, the hydrogen of about 0.3 bar is supplied to the stack using a decompression process in two steps. In other words, the hydrogen with a pressure of about 700 bar of the high pressure hydrogen storing tank is decompressed to a pressure of about 10 bar using a high pressure regulator, and then the hydrogen is decompressed again to 0.3 bar by a low pressure regulator disposed at a front end of the stack, and finally, the decompressed hydrogen is supplied to the stack. However, the hydrogen with the high pressure of about 700 bar stored in the hydrogen storing tank may be very dangerous.

In particular, the main concern is that the hydrogen may cause a fire or an explosion, when the fuel cell vehicle catches fire. For example, when a pressure inside the tank is increased by an increase in a temperature when an internal and external fire of the fuel cell vehicle occurs, and the pressure is increased to a regulated internal pressure or greater, the tank may explode. Accordingly, when a fire of the fuel cell vehicle occurs, and fire suppression workers attempt to suppress (e.g., put out) the fire, or a third person attempts to rescue a driver passengers within the vehicle, no accurate information regarding a status of the hydrogen tank is available, thus increasing the possibility of a secondary accident.

The above information disclosed in this section is merely for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and to achieve safe fire suppression and life rescue activities by visually and/or audibly notifying whether hydrogen inside a hydrogen storing tank is exhausted (e.g., dissipated).

The present invention provides an apparatus that indicates a status of a hydrogen tank when a vehicle fire occurs that may include: a hydrogen storing tank; a thermal pressure relief device (TPRD) disposed within a valve of the hydrogen storing tank; a sensor configured to detect a flow rate of hydrogen discharged from the hydrogen storing tank; and a controller configured to determine whether the flow rate of discharged hydrogen detected by the sensor is within a predetermined reference flow rate range and transmit a warning signal when the flow rate of discharged hydrogen detected by the sensor is within the predetermined reference flow rate range. The reference flow rate range may be set to a range of about 30 grams per second (g/sec) to about 70 g/sec.

The controller may be further configured to transmit a warning signal and operate an alarm device when the detected flow rate of discharged hydrogen is within the predetermined reference flow rate range. In addition, the alarm device may be one or more devices selected from the group consisting of: a horn, an antitheft warning device, an emergency light, and a headlight. When the flow rate of discharged hydrogen detected by the sensor exceeds the predetermined reference flow rate range, the controller may be configured to transmit an access prohibition signal. Additionally, the sensor may be a flow rate sensor or a pressure sensor mounted at an outlet of the hydrogen storing tank.

The present invention also provides a method for indicating a status of a hydrogen tank when a vehicle fire occurs. The method may include: detecting, by a controller, a flow rate of hydrogen discharged from a hydrogen storing tank when a fire occurs in a fuel cell vehicle using a sensor; comparing, by the controller, the detected flow rate of discharged hydrogen and a predetermined reference flow rate range; and transmitting, by the controller, a warning signal when the detected flow rate of discharged hydrogen is within the predetermined reference flow rate range. The reference flow rate range may be a range of about 30 grams per second (g/sec) to about 70 g/sec.

The method may further include operating, by the controller, an alarm device. The alarm device may include one or more devices selected from the group consisting of: a horn, an antitheft warning device, an emergency light, and a headlight of the vehicle. Further, the method may include transmitting, by the controller, an access prohibition signal when the detected flow rate of discharged hydrogen exceeds (e.g., is greater than) the reference flow rate range as a result of the comparison of the flow rate of discharged hydrogen and the reference flow rate range. In addition, the sensor may include a pressure sensor configured to detect a pressure within the hydrogen storing tank, and the detection of the flow rate of hydrogen may include detecting, by the controller, the flow rate of discharged hydrogen using a pressure value within the tank detected by the pressure sensor.

According to the exemplary embodiments of the present invention, the apparatus and the method for indicating the status of the hydrogen tank may more simply determine whether the TPRD is expanded based on the flow rate at the valve side of the hydrogen storing tank, determine whether a pressure exists inside the tank based on the determination on the expansion of the TPRD, and notify a user and a fire suppression worker (e.g., firefighter) outside the vehicle of the existence or the nonexistence of the pressure within the tank when a fire occurs, which may ensure safety during fire suppression and life rescue activities. Accordingly, the apparatus and the method of warning safety of the hydrogen tank according to the present invention may prevent a secondary accident from occurring due to a vehicle fire.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
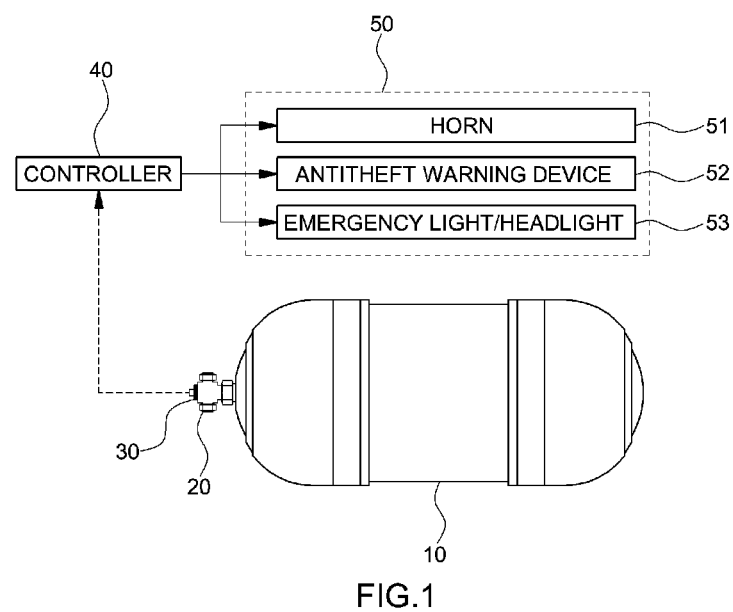
FIG. 1 is an exemplary diagram illustrating a schematic configuration of an apparatus for warning safety of a hydrogen tank when a vehicle fire occurs according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an apparatus and a method for indicating a status of a hydrogen tank when a vehicle fire occurs and an apparatus and a method for notifying a status of a hydrogen tank to the exterior by monitoring whether a thermal pressure relief device (TPRD) mounted within a solenoid valve of a hydrogen storing tank is expanded and determining whether a pressure within the tank exists.

Currently, vehicle regulations, such as EC79/2009, the global technical regulation (GTR), and the Automobile Management Act of Korea, that regulate a fuel cell vehicle, consider when a fire occurs within a fuel cell vehicle as a substantially dangerous situation, and explicitly state that a pressure inside a tank should be continuously discharged via the TPRD without interruption when a fire occurs. Accordingly, the TPRD is mounted within a solenoid valve attached to a tank, and when the TPRD detects a predetermined temperature or greater, the TPRD is configured to mechanically discharge a pressure of the tank to an exterior of the tank.

In particular, a flame of about 4 centimeters (cm) to about 6 cm based on an outermost side of a vehicle may be output when the pressure of the tank is discharged, and even though hydrogen inside the tank is discharged by expansion of the TPRD, an external user or a fire suppression worker may not determine whether hydrogen inside the tank is discharged. Accordingly, the present invention provides a technique of recognizing whether hydrogen within the tank is abnormally discharged (e.g., insufficiently discharged), and warning and notifying an external user or a fire suppression worker of whether the hydrogen exists inside the tank before the discharge of the hydrogen or whether the hydrogen inside the tank is exhausted after the discharge of the hydrogen.

Hereinafter, an apparatus and a method of warning safety of a hydrogen tank when a vehicle fire occurs according to an exemplary embodiment of the present invention will be described in detail with reference to the accompanying drawings.

FIG. 1 is an exemplary diagram illustrating a schematic configuration of an apparatus for indicating a status of a hydrogen tank when a vehicle fire occurs according to an exemplary embodiment of the present invention. The apparatus may include a TPRD mounted within a hydrogen storing tank and operated under a specific condition. The TPRD may be mounted within a solenoid valve of the hydrogen storing tank, and may be configured to discharge internal gas when the hydrogen storing tank is exposed to flames when a fire occurs. For example, the TPRD may include fuse metal and may be configured to discharge hydrogen gas within the hydrogen storing tank by opening a valve while a metal is melted the tank is exposed to a flame.

Referring to FIG. 1, the apparatus may also include a hydrogen storing tank within which the solenoid valve may be mounted, and the TPRD may be mounted within the solenoid valve. Further, the apparatus may include a sensor configured to detect a flow rate of hydrogen discharged from the hydrogen storing tank and a controller configured to transmit a warning signal based on the detection by the sensor unit. The controller may be further configured to operate the TPRD and the sensor.

The sensor may be configured to detect a flow rate of the hydrogen discharged from the hydrogen storing tank and enable a user to directly/indirectly confirm a flow rate of discharged hydrogen. For example, the sensor may include a flow rate sensor mounted at a side of an outlet line of the hydrogen storing tank to enable a user to directly confirm a flow rate of the hydrogen discharged from the tank. When a pressure sensor is mounted at a side of an outlet of the hydrogen storing tank, the sensor may include the pressure sensor and may be configured to detect a flow rate from a variation of the pressure detected by the pressure sensor. In addition, the sensor may be configured to continuously monitor a flow rate of discharged hydrogen of the hydrogen storing tank using the above configuration, and the controller may be further configured to receive a value of the monitored flow rate of discharged hydrogen, and operate an alarm device based on a result of a comparison between the received value and a predetermined reference flow rate range.

In particular, a reference flow rate to be compared with the detected flow rate of discharged hydrogen may be pre-set within the controller. In addition, the controller may be configured to determine whether the TPRD is expanded by comparing the reference flow rate and the detected value. Accordingly, the controller may be configured to determine whether the TPRD is expanded based on a result of the detected of the flow rate of the hydrogen discharged from the hydrogen storing tank and transmit a warning signal for operating the alarm device when the TPRD is expanded.

More particularly, when the TPRD is expanded, hydrogen gas within the tank may be discharged via the solenoid valve, and the hydrogen gas discharged may have a substantially large value compared to the flow rate of hydrogen supplied to the stack while the vehicle is operated. For example, when the fuel cell vehicle that has a mileage of about 600 km (e.g., a capacity of the tank is about 5.64 kg) operates at about 150 km until the fuel is exhausted, the hydrogen may be supplied at a flow rate of about 0.4 grams per second (g/sec). By contrast, when the TPRD expands, the flow rate of discharged hydrogen may be about several tens g/sec, and thus whether the TPRD is expanded may be determined by observing the flow rate of discharged hydrogen. In other words, when the hydrogen storing tank is locally or generally engulfed by flame due to fire occurrence, a temperature and a pressure inside the tank may continuously increase.

When the TPRD expands due to an increase in the temperature and the valve is opened, the pressure inside the tank may substantially decrease due to discharge of the hydrogen gas. When the hydrogen is discharged causing the tank that is about 40 liters (L) to have a pressure of about 10 bar or less, a time period of about 20 seconds may elapse. Further, when the hydrogen is discharged causing the tank that is about 104 L to have a pressure of 10 bar or less, a time period of about 60 seconds may elapse. Considering the discharge time, the reference flow rate range may be set from about 30 g/sec to about 70 g/sec.

However, the reference flow rate range may be variable according to various design specifications, such as a valve structure and a pressure within the hydrogen tank, thus the reference flow rate range is not limited to the aforementioned reference flow rate range, and may be appropriately changed and applied based on circumstances. Accordingly, in the present exemplary embodiment, the reference flow rate range having an appropriate value may be pre-set, and whether the TPRD is expanded may be determined by comparing the value of the flow rate detected by the sensor and the reference flow rate range. In other words, when the flow rate of discharged hydrogen detected by the sensor is within the predetermined reference flow rate range, the TPRD may be determined to be expanded, a the controller may be configured to transmit the warning signal. In particular, the controller may be configured to operate the alarm device (e.g., a horn, an antitheft warning device, an emergency light, and a headlight) by transmitting the warning signal.

The alarm devices may be configured to be independently or simultaneously operate, and output auditory and/or visual alarm signals to the exterior. The controller may be configured to transmit the warning signal to provide a notification of the expansion of the TPRD when the controller determines the TPRD is expanded. In addition, when the TPRD is not expanded, the controller may be configured to transmit an access prohibition signal that notifies a user and passengers that the TPRD is not expanded.

When the TPRD is not expanded, a risk of explosion may exist, and a flame may be propagated to the exterior based on the expansion of the TPRD to cause a risk of injury, so the access prohibition signal may prevent a secondary accident (e.g., a follow up accident). The access prohibition signal may be output visually or audibly from the warning signal notifying of the expansion of the TPRD.

Figure 2:
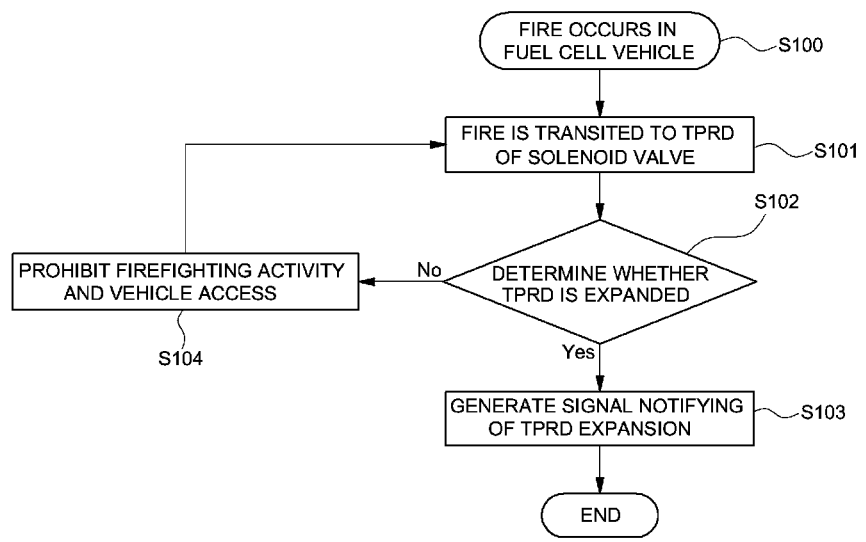
FIG. 2 is an exemplary flowchart illustrating schematic operations of a method of warning safety of a hydrogen tank when a vehicle fire occurs according to an exemplary embodiment of the present invention.

FIG. 2 is an exemplary flowchart illustrating schematic operations of a method of warning safety of a hydrogen tank when a vehicle fire occurs according to an exemplary embodiment of the present invention. As illustrated in FIG. 2, the method of indicating a status of a hydrogen tank when a vehicle fire occurs may be configured to determine whether the TPRD is expanded when a fire is applied to the TPRD of the fuel cell vehicle and transmit a warning signal notifying the expansion of the TRPD.

In particular, the method of warning safety of the hydrogen tank when a vehicle fire occurs according to the exemplary embodiment of the present invention may include: detecting, by a controller, a flow rate of hydrogen discharged from the hydrogen storing tank when a fire occurs in the fuel cell vehicle, comparing, by the controller, the detected flow rate of discharged hydrogen and a predetermined reference flow rate range, and transmitting, by the controller, a warning signal when the flow rate of discharged hydrogen detected by the sensor is within the reference flow rate range.

The warning signal transmitted during the operation may be configured to operate the alarm device. Accordingly, the method may further include operating, by the controller, the alarm device. As described above, the alarm device may be one or more devices selected from the group consisting of: a horn, an antitheft warning device, an emergency light, and a headlight of the vehicle. The reference flow rate range may be a range when the TPRD is determined to be expanded. In particular, the reference flow rate range may be a range of about 30 g/sec to about 70 g/sec.

The method may further include transmitting, by the controller, an access prohibition signal to prohibit access to the vehicle when the TPRD is not expanded. In other words, when the flow rate of discharged hydrogen exceeds the reference flow rate range as a result of the comparison between the flow rate of discharged hydrogen and the reference flow rate range, the controller may be configured to transmit the access prohibition signal. The access prohibition signal may provide a notification to a user to allow a user to visually or audibly recognize the access prohibition signal by operating the alarm device using the warning signal similar to the aforementioned warning signal for operating the alarm device.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for warning safety of a hydrogen tank when a vehicle fire occurs, comprising:
   a hydrogen storing tank;
   a thermal pressure relief device (TPRD) mounted within a valve of the hydrogen storing tank; and
   a controller configured to:
   detect an occurrence of the vehicle fire;
   determine an expansion of the TPRD when a detected flow rate of discharged hydrogen from the hydrogen storing tank is within a predetermined reference flow rate range; and
   transmit a warning signal as a notification to a user in response to determining the expansion of the TPRD when the vehicle fire occurs,
   wherein the reference flow rate range is a range of about 30 grams per second (g/sec) to about 70 g/sec, and
   wherein the TPRD includes fuse metal.

2. The apparatus of claim 1, wherein the controller is further configured to:
   transmit a warning signal; and
   operate an alarm device.

3. The apparatus of claim 2, wherein the alarm device is one or more devices selected from the group consisting of: a horn, an antitheft warning device, an emergency light, and a headlight.

4. The apparatus of claim 3, wherein when the detected flow rate of discharged hydrogen exceeds the predetermined reference flow rate range, the controller is configured to transmit an access prohibition signal.

5. The apparatus claim 3, wherein a sensor used to detect the flow rate of hydrogen discharged from the hydrogen storing tank is a flow rate sensor or a pressure sensor mounted at an outlet side of the hydrogen storing tank.

6. A method of warning safety of a hydrogen tank when a vehicle fire occurs, comprising:
   detecting, by a controller, an occurrence of the vehicle fire;
   determining, by the controller, an expansion of the TPRD when a detected flow rate of hydrogen discharged from the hydrogen storing tank is within a predetermined reference flow rate range; and
   transmitting, by the controller, a warning signal as a notification to a user in response to determining the expansion of the TPRD when the vehicle fire occurs,
   wherein the reference flow rate range is a range of about 30 grams per second (g/sec) to about 70 g/sec, and
   wherein the TPRD includes fuse metal.

7. The method of claim 6, further comprising operating, by the controller, an alarm device when the detected flow rate of discharged hydrogen is within the predetermined reference flow rate range.

8. The method of claim 7, wherein the alarm device includes one or more devices selected from the group consisting of: a horn, an antitheft warning device, an emergency light, and a headlight of the vehicle.

9. The method of claim 8, further comprising:
   transmitting, by the controller, an access prohibition signal when the detected flow rate of discharged hydrogen exceeds the reference flow rate range.

10. The method of claim 8, wherein a sensor used to detect the flow rate of hydrogen discharged from the hydrogen storage tank includes a pressure sensor configured to detect a pressure within the hydrogen storing tank, and the detection of the flow rate of hydrogen includes detecting, by the controller, the flow rate of discharged hydrogen using a pressure value within the tank detected by the pressure sensor.

11. A non-transitory computer readable medium containing program instructions executed by a controller, the computer readable medium comprising:
   program instructions that detect an occurrence of a vehicle fire;
   program instructions that determine an expansion of the TPRD when a detected flow rate of hydrogen discharged from the hydrogen storage tank is within a predetermined reference flow rate range; and
   program instructions that transmit a warning signal as a notification to a user in response to determining the expansion of the TPRD when the vehicle fire occurs,
   wherein the reference flow rate range is a range of about 30 grams per second (g/sec) to about 70 g/sec, and
   wherein the TPRD includes fuse metal.

12. The non-transitory computer readable medium of claim 11, further comprising program instructions that operate an alarm device when the detected flow rate of discharged hydrogen is within the predetermined reference flow rate range.

13. The non-transitory computer readable medium of claim 11, wherein the alarm device includes one or more devices selected from the group consisting of: a horn, an antitheft warning device, an emergency light, and a headlight of the vehicle.

14. The non-transitory computer readable medium of claim 13, further comprising:
program instructions that transmit an access prohibition signal when the detected flow rate of discharged hydrogen exceeds the reference flow rate range.

15. The non-transitory computer readable medium of claim 13,wherein a sensor used to detect the flow rate of hydrogen discharged from the hydrogen storing tank includes a pressure sensor configured to detect a pressure within the hydrogen storing tank, and the program instructions that detect the flow rate of hydrogen includes program instructions that detect the flow rate of discharged hydrogen using a pressure value within the tank detected by the pressure sensor.

* * * * *